(12) United States Patent
Yarabolu

(10) Patent No.: US 12,039,079 B2
(45) Date of Patent: Jul. 16, 2024

(54) SYSTEM AND METHOD TO SECURE DATA PIPELINES USING ASYMMETRIC ENCRYPTION

(71) Applicant: BANK OF AMERICA CORPORATION, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 238 days.

(21) Appl. No.: 17/716,496

(22) Filed: Apr. 8, 2022

(65) Prior Publication Data

US 2023/0325527 A1   Oct. 12, 2023

(51) Int. Cl.
| | |
|---|---|
| G06F 21/62 | (2013.01) |
| G06F 18/21 | (2023.01) |
| G06F 21/60 | (2013.01) |
| G06F 21/84 | (2013.01) |
| G06N 20/00 | (2019.01) |
| G06F 21/10 | (2013.01) |

(52) U.S. Cl.
CPC ...... *G06F 21/6245* (2013.01); *G06F 18/2185* (2023.01); *G06F 21/602* (2013.01); *G06F 21/84* (2013.01); *G06N 20/00* (2019.01); *G06F 21/107* (2023.08)

(58) Field of Classification Search
CPC .... G06F 21/6245; G06F 21/602; G06F 21/84; G06F 21/107; G06F 18/2185; G06N 20/00
See application file for complete search history.

(56) References Cited

U.S. PATENT DOCUMENTS

| | | |
|---|---|---|
| 8,185,498 B2 | 5/2012 | Anglin |
| 8,229,939 B2 | 7/2012 | Staddon et al. |
| 8,725,666 B2 | 5/2014 | Lemmond et al. |
| 8,862,897 B2 | 10/2014 | Pogmore |
| 8,917,872 B2 | 12/2014 | Li et al. |
| 9,009,567 B2 | 4/2015 | Baptist et al. |
| 9,037,870 B1 | 5/2015 | Zheng et al. |
| 9,262,434 B1 | 2/2016 | Shilane et al. |
| 9,311,187 B2 | 4/2016 | Resch et al. |
| 9,313,028 B2 | 4/2016 | Tamayo-Rios |

(Continued)

*Primary Examiner* — Viet D Vu

(57) ABSTRACT

A method of securing a data set using encryption and scaling. The data set comprises a modeling and validation section with each section having text and numeric data. For each section, the method encrypts text data using a public key and scales numeric data using a scaling factor. The method builds a model by applying the encrypted modeling section to the algorithm to generate modeling text data, numeric data, and patterns derived therefrom. The method generates validation text data, numeric data, and patterns derived therefrom by applying the encrypted validation section to the model. The method compares the patterns from each section and validates the model based on the comparison. The method decrypts the generated modeling text data and validation text data using a private key and descales the modeling numeric data and validation numeric data using the scaling factor. The method verifies the model by comparing the decrypted text data and descaled numeric data to the same in the data set.

20 Claims, 4 Drawing Sheets

(56) References Cited

U.S. PATENT DOCUMENTS

| | | | |
|---|---|---|---|
| 9,348,857 B2 | 5/2016 | Glover | |
| 9,727,275 B2 | 8/2017 | Kazi | |
| 9,900,147 B2 | 2/2018 | Laine et al. | |
| 9,916,114 B2 | 3/2018 | Resch | |
| 9,946,810 B1 | 4/2018 | Trepetin et al. | |
| 9,959,065 B2 | 5/2018 | Ateniese et al. | |
| 9,967,101 B2 | 5/2018 | Hartloff et al. | |
| 9,971,906 B2 | 5/2018 | Mattsson | |
| 10,068,005 B2 | 9/2018 | Schneider | |
| 10,108,817 B2 | 10/2018 | Riva et al. | |
| 10,146,958 B2 | 12/2018 | Wang et al. | |
| 10,270,599 B2 | 4/2019 | Nadeau et al. | |
| 10,282,440 B2 | 5/2019 | Dhuse et al. | |
| 10,338,968 B2 | 7/2019 | Bequet et al. | |
| 10,362,111 B2 | 7/2019 | Resch et al. | |
| 10,395,180 B2 | 8/2019 | Wang et al. | |
| 10,402,269 B2 | 9/2019 | Dhuse et al. | |
| 10,491,373 B2 | 11/2019 | Jain et al. | |
| 10,673,613 B2 | 6/2020 | Zheng | |
| 10,693,657 B2 | 6/2020 | Yan | |
| 10,901,950 B2 | 1/2021 | Gupta | |
| 10,917,235 B2 | 2/2021 | Gama et al. | |
| 10,985,902 B2 | 4/2021 | Kamara et al. | |
| 11,062,303 B2 | 7/2021 | Maxwell | |
| 11,120,102 B2 | 9/2021 | Mcmahan et al. | |
| 11,157,366 B1 | 10/2021 | Resch | |
| 11,182,366 B2 | 11/2021 | Anderson et al. | |
| 11,182,782 B2 | 11/2021 | Wright et al. | |
| 2016/0306699 A1 | 10/2016 | Resch et al. | |
| 2017/0149572 A1 | 5/2017 | Wallrabenstein | |
| 2017/0249551 A1 | 8/2017 | Iljazi | |
| 2017/0331629 A1 | 11/2017 | Kozolchyk et al. | |
| 2018/0307859 A1 | 10/2018 | Lafever et al. | |
| 2019/0294995 A1* | 9/2019 | Pastor Perales | G06N 5/04 |
| 2020/0104636 A1 | 4/2020 | Halevi et al. | |
| 2020/0134461 A1 | 4/2020 | Chai et al. | |
| 2020/0167859 A1 | 5/2020 | Bell et al. | |
| 2020/0234121 A1* | 7/2020 | Stapleton | G06N 3/02 |
| 2020/0242466 A1 | 7/2020 | Mohassel et al. | |
| 2020/0244435 A1* | 7/2020 | Shpurov | G06F 21/64 |
| 2020/0280437 A1 | 9/2020 | Yuan et al. | |
| 2020/0293941 A1* | 9/2020 | Bos | G06N 20/00 |
| 2021/0049507 A1 | 2/2021 | Feng et al. | |
| 2021/0241166 A1 | 8/2021 | Horesh et al. | |
| 2022/0385449 A1* | 12/2022 | Brochonski | H04L 9/008 |

* cited by examiner

SYSTEM AND METHOD TO SECURE DATA PIPELINES USING ASYMMETRIC ENCRYPTION

TECHNICAL FIELD

The present disclosure relates generally to data security and, more specifically, to a system and method to secure data pipelines using asymmetric encryption.

BACKGROUND

Data is a vital component for any company doing business in the information technology field. Service providers store confidential data and these data are available to certain people, such as information technology personnel, data scientists, data analysts, and developers, as needed in the performance of his or her duties. As an example, if a data scientist is building an analytics authentication model or credit card model to predict risky logins, customer authentication and account data are needed to build the model. Although access to the data is important, maintaining the security, privacy, and integrity of the data is critical. Traditionally, digital rights management technologies are used in governing access to sensitive data based on user, system, and application rights in the storage, management, and use of sensitive data. These technologies can be complex, expensive, and difficult to use and maintain. Furthermore, industry best practice methods require that access to the data is strictly limited and in certain application or system development scenarios this can impede progress.

SUMMARY

The present disclosure describes a system and method of using asymmetric encryption of data pipelines when developing analytics models. The present disclosure also describes a system and method of using asymmetric encryption to secure data pipelines when using analytics models. The system and method are integrated with security controllers and model development controllers used to secure sensitive data sets and develop analytics models using the secure sensitive data sets. The system and method are also integrated in routing controllers and predictive analytics controllers used to secure sensitive evaluation input data and generate predictive results by applying secure sensitive evaluation input data to developed analytics models. The system and method are improvements over state of the art digital rights technologies in that the sensitive data are not exposed in plain text to an end user during development and use of developed models.

In a practical application, the system and method can be integrated into a company's information technology network in lieu of traditional digital rights technologies to improve data security and to allow access to and use of sensitive data for the purpose of application and model development while precluding security threats that are necessarily caused when using traditional digital rights technology. In the case of analytics, model development, and model use, there can be a plurality of players involved, e.g. software developers, data analysts, data scientists, and potentially a very large numbers of users. The use of digital rights in this case results in increased use of infrastructure processing and storage resources. The increased use of processing cycles is a result of processing cycles per user required to manage access to the sensitive data. In the case of using asymmetric encryption, the content of the sensitive data is not exposed to the end user in plain text, so access management does not require strict access control. Furthermore, processing cycles as well as storage per key pair per users (system/application, software developers, data analysts, data scientists, and users) is increased in without the use of asymmetric encryption. It should also be understood that in some cases these disadvantages in using digital rights technologies can be amplified considering the potential number of entities requiring access to the data and the sources of the data, e.g. a company's information technology network may comprise a plurality of infrastructure components used to store and maintain sensitive data relating to human resources, legal, research, product development, customers, and more.

Described in greater detail is a system comprising one or more memories and one or more processors communicatively coupled to the one or more memories. The one or more memories are configured to store a data set, at least one public and private key pair, at least one machine learning algorithm, and at least one scaling factor. The data set comprises a model development section that includes first text data and first numeric data and a validation section that includes second text data and second numeric data.

The one or more processors are configured to obfuscate the model development section by encrypting the first text data using a public key of a public and private key pair and by scaling the first numeric data using a scaling factor. The one or more processors are also configured to obfuscate the validation section by encrypting the second text data using the public key of the public and private key pair and by scaling the second numeric data using the scaling factor. The one or more processors are also configured to build a model by generating first output data from the obfuscated model development section and deriving first output patterns from the first output data by executing a machine learning algorithm. The first output data includes third text data and third numeric data. The one or more processors are also configured to generate second output data by applying the obfuscated validation section to the model and deriving second output patterns from the second output data. The second output data includes fourth text data and fourth numeric data. The one or more processors compare the obfuscated first output patterns with the obfuscated second output patterns and validate the model based on differences in the obfuscated first output patterns and the second output patterns. The one or more processors are also configured to decipher the first output data by decrypting the third text data using a private key of the public and private key pair and by scaling the third numeric data using the scaling factor. The one or more processors decipher the second output data by decrypting the fourth text data using the private key of the public and private key pair and by scaling the fourth numeric data using the scaling factor. The one or more processors are also configured to compare the decrypted third text data, the decrypted third numeric data, the decrypted fourth text data and the decrypted fourth numeric data, or any combination thereof with the data set. The one or more processors are also configured to verify the model based on differences in the comparison of the decrypted third text data, the decrypted third numeric data, the decrypted fourth text data and the decrypted fourth numeric data, or any combination thereof with the data set.

In some embodiments, the data set is a training data set and the one or more processors are further configured to: generate the first output data and derive the first output patterns using a supervised machine learning algorithm; and generate the second output data and derive the second output patterns by using the supervised machine learning algorithm.

In other embodiments, the data set comprises untagged data and the one or more processors are further configured to: generate the first output data and derive the first output patterns using an unsupervised machine learning algorithm; and generate the second output data and derive the second output patterns using the unsupervised machine learning algorithm.

In yet other embodiments, the one or more processors are further configured to verify the model by comparing the deciphered first output data and the deciphered second output data with the data set, the data set comprising cleansed text data, cleansed numeric, uncleansed text data, uncleansed numeric data, or any combination thereof.

In still yet other embodiments, the one or more memories configured to store evaluation input data comprising evaluation text data and evaluation numeric data; the one or more processors configured to: obfuscate the evaluation text data by encrypting the evaluation text data using the public key and scaling the evaluation numeric data using a scaling factor; populate a parameter space of the validated model using the obfuscated evaluation text data and the obfuscated evaluation numeric data; and execute the model to generate obfuscated model output data.

In yet additional embodiments, the one or more processors are further configured to: decipher the encrypted evaluation text data by decrypting the encrypted evaluation text data using the private key and scaling the evaluation numeric data using the scaling factor; and cause the deciphered evaluation text data and deciphered evaluation numeric data to be displayed on a user device.

In some other embodiments, the one or more processors are further configured to clean the data set.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
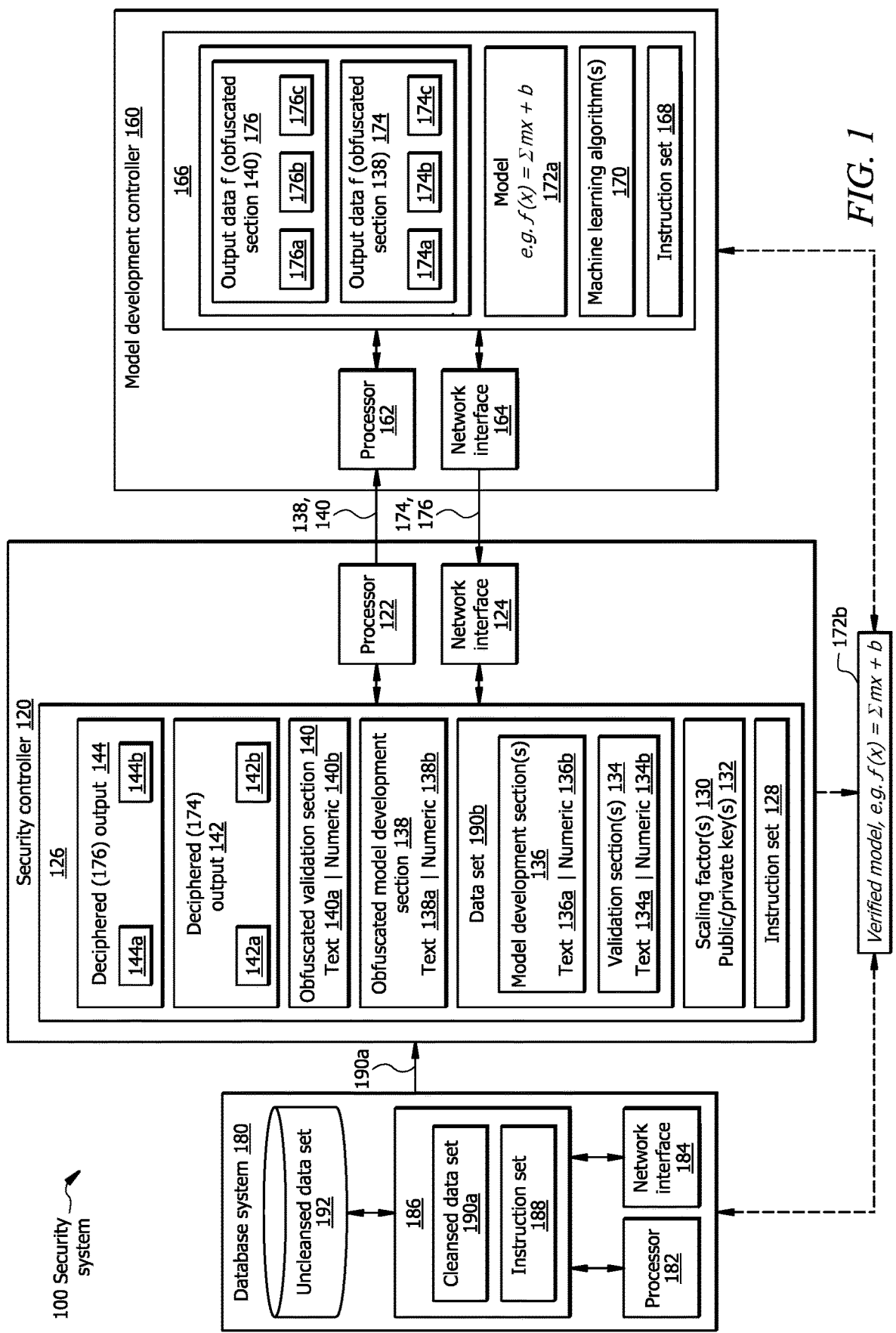
FIG. 1 illustrates an example embodiment of a security system used to secure sensitive data during the development of an application modeled on the particulars of the sensitive data.
Figure 2:
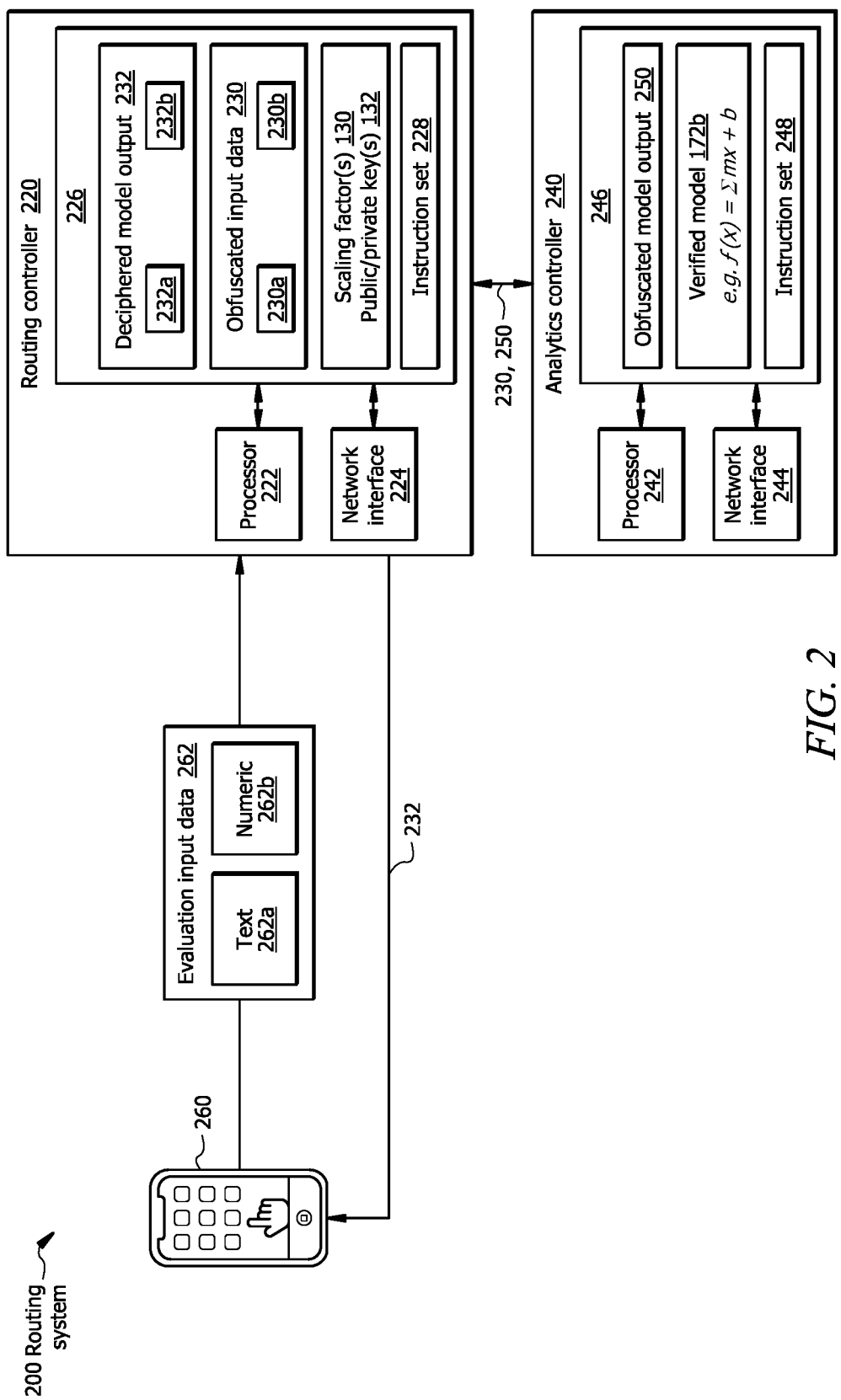
FIG. 2 illustrates an example embodiment of a routing system used to secure sensitive data during the use of the application modeled on the particulars of the sensitive data.
Figure 3:
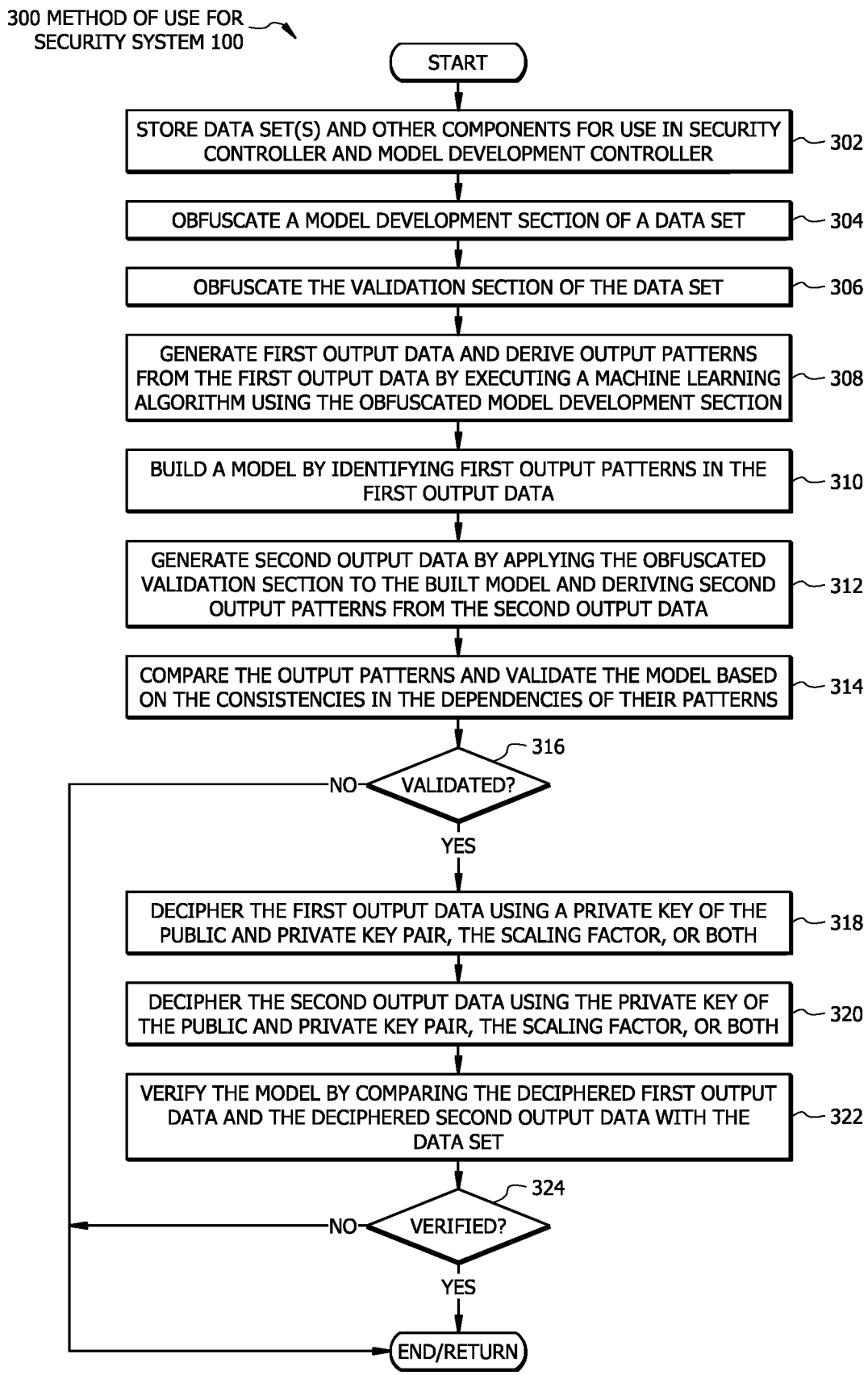
FIG. 3 illustrates an example embodiment of a method for an operational flow of the security system.
Figure 4:
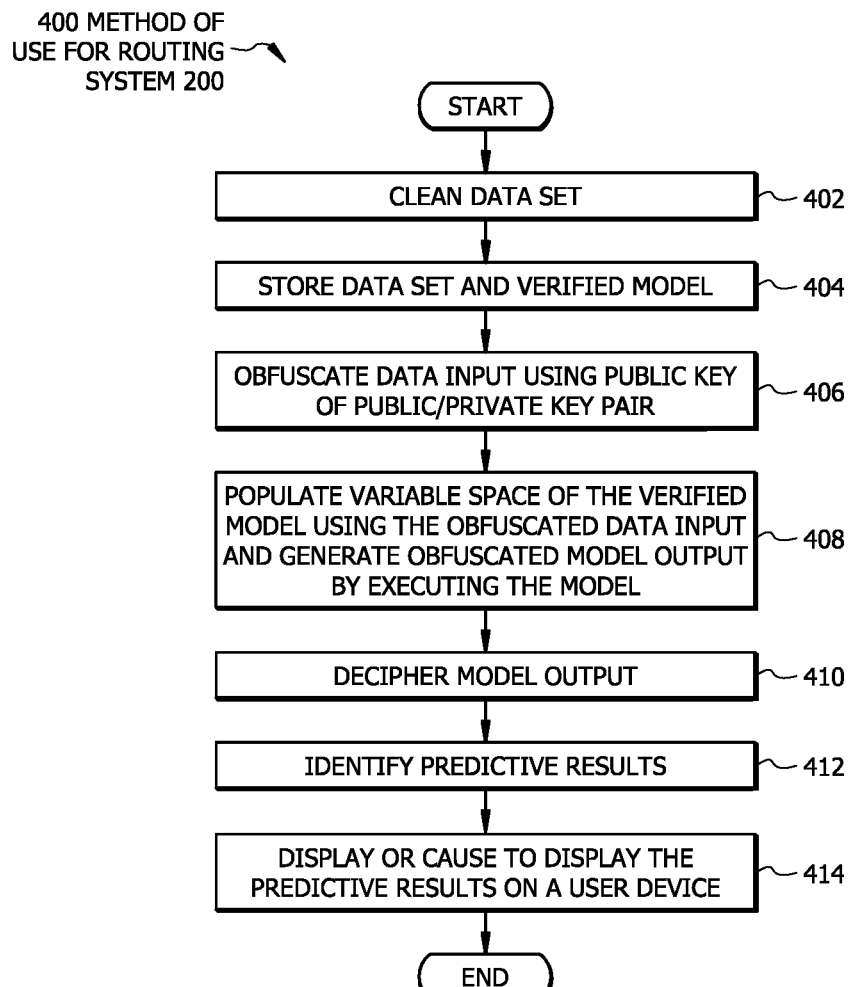
FIG. 4 illustrates an example embodiment of a method for an operational flow of the routing system.

As described above, previous technologies use digital rights technologies to govern access to and use of sensitive data. These technologies are expensive and difficult to use and maintain. In addition, traditional industry practice is to strictly limit who has access to, management of, and use of the data. This disclosure addresses those limitations by using obfuscation techniques, such as asymmetric encryption and scaling factors, to secure sensitive data before developing a machine learning algorithmic model and using the model without affecting the development or impacting the performance of the model. FIG. 1 illustrates an example embodiment of a security system 100 comprising a security controller 120, a model development controller 160, and a database system 180 used to secure sensitive data during the development of an application modeled on the particulars of the sensitive data. FIG. 2 illustrates an example embodiment of a routing system 200 comprising a routing controller 220, an analytics controller 240, and a user device 260 used to secure sensitive data during the use of the application modeled on the particulars of the sensitive data. FIG. 3 illustrates an example embodiment of a method 300 for an operational flow of the security system 100. FIG. 4 illustrates an example embodiment of a method 400 for an operational flow of the routing system 200.

Example System to Secure Data Pipelines Using Asymmetric Encryption

Referring to FIG. 1, the security controller 120 comprises a processor 122, a network interface 124, and a memory 126. The memory 126 comprises an instruction set 128, a scaling factor(s) 130, public/private key(s) pair 132, and a data set 190b having a validation section 134 and a model development section 136, obfuscated model development section 138, obfuscated validation section 140, deciphered first output 142, and deciphered second output 144.

The model development controller 160 comprises a processor 162, a network interface 164, and a memory 166. The memory 166 comprises an instruction set 168 that comprises a machine learning algorithm 170, a validated model 172, a first output data 174, and a second output data 176.

The database system 180 comprises a processor 182, a network interface 184, a memory 186, and a database 192. The memory 186 comprises an instruction set 188 and a cleansed data set 190a. The database 192 comprises an uncleansed data set 192.

In model development operations, the security controller 120 obfuscates the data set 190b provided by the database system 180 using a public key of the public/private key(s) pair 132 and the scaling factor 130. The model development controller 160 develops the model 172a by applying the obfuscated data set 190b to the machine learning algorithm 170 to generate output data, the first output data 174, with recognizable patterns. The model development controller 160 applies the obfuscated validation section 140 to the model 172a to generate output data, the second output data 176, that have recognizable patterns. The model development controller 160 validates the model 172a by comparing the second output data 176 with the first output data 174 and determining their similarities. The security controller 120 generates the deciphered first output 142 and the deciphered second output 144 by applying a private key of the public/private key(s) pair 132 to the first output data 174 and the second output data 176. The database system 180, the security controller 120, or both verify the validated model 172a by comparing the deciphered first output 142 and the deciphered second output 144 with the data set 190a, data set 190b, or both.

Referring to FIG. 2, the routing controller 220 comprises a processor 222, a network interface 224, and a memory 226. The memory 226 comprises an instruction set 228, a public/private key(s) 132, an obfuscated input data 230, and a deciphered model output 232. The analytics controller 240 comprises a processor 242, a network interface 244, and a memory 246. The memory 246 comprises an instruction set 248, a verified model 172b, and an obfuscated model output 250.

In using the verified model 172b, the routing controller 220 obfuscates input data 262 of the user device 260 using the public key of the public/private key(s) pair 132. The analytics controller 240 applies the obfuscated input data 230 to the verified model 172b to generate the obfuscated model output 250. The routing controller 220 deciphers the obfuscated model output 250 by applying the private key of the public/private key(s) pair 132 to the obfuscated model output 250. The deciphered model output 232 is displayed on the user device 260.

System Components

Security System

Security Controller

The security controller 120 is a device that is configured to process data and communicate with computing devices, databases, systems, etc., via one or more networks. The security controller 120 is generally configured to secure sensitive data, decipher model output, and verify model output. This operation is described further below in conjunction with the sections entitled "Operational Flow" and "Example methods."

The processor 122 is in signal communication with the network interface 124 and the memory 126. Memory 126 is configured to store software instruction set 128 that when executed by the processor 122, causes the processor 122 to perform one or more functions described herein. For example, when the software instruction set 128 is executed, the processor 122 can store data sets, encryption and decryption keys and scaling factors, section data sets into model development sections and validation sections, secure the sections using an encryption keys and scaling factors, decrypt model output data using decryption keys, and validate model output data against data sets. The security controller 120 may be configured as shown, or in any other configuration.

Processor 122 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 124 and memory 126. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 128 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 124 is configured to enable wired and/or wireless communications. The network interface 124 is configured to communicate data between the memory 126 and other network devices, systems, or domain(s). For example, the network interface 124 may comprise a WIFI interface, a local area network (LAN) interface, a wide area network (WAN) interface, a modem, a switch, or a router. The processor 122 is configured to send and receive data using the network interface 124 and memory 126. The network interface 124 may be configured to use any suitable type of communication protocol.

Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 is operable to store the data and instructions as described with respect to FIGS. 1-4. The software instruction set 128 may comprise any suitable set of instructions, logic, rules, or code operable to execute the processor 122.

Model Development Controller

The model development controller 160 is a device that is configured to process data and communicate with computing devices, databases, systems, etc., via one or more networks. The model development controller 160 is generally configured to build a model using encrypted and scaled data, generate encrypted and scaled outputs using the encrypted and scaled outputs, build an analytics model based on derived patterns in the outputs, and validate the model based on the derived patterns. This operation is described further below in conjunction with the sections entitled "Operational Flow" and "Example methods."

The processor 162 is in signal communication with the network interface 164 and the memory 166. Memory 166 is configured to store software instruction set 168 that when executed by the processor 162, causes the processor 162 to perform one or more functions described herein. For example, when the software instruction set 168 is executed, the processor 162 can store a machine learning algorithm and the encrypted and scaled model development section and the encrypted and scaled validation section of the data set. The processor 162 can also generate encrypted and scaled outputs by applying encrypted and scaled model development sections and encrypted and scaled validation sections to the machine learning algorithm and build analytics models based on output patterns derived from generated outputs. The processor 162 can also compare output patterns associated with model development sections with output patterns associated with validation sections and validate analytics models based on results of the comparisons. The model development controller 160 may be configured as shown, or in any other configuration.

Processor 162 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 162 may be a programmable logic device, a microcontroller, a microprocessor, or any suitable combination of the preceding. The processor 162 is communicatively coupled to and in signal communication with the network interface 164 and memory 166. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 168 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 164 is configured to enable wired and/or wireless communications. The network interface 164 is configured to communicate data between the memory 166 and other network devices, systems, or domain(s). For example, the network interface 164 may comprise a WIFI interface, a local area network (LAN) interface, a wide area network (WAN) interface, a modem, a switch, or a router. The processor 162 is configured to send and receive data using the network interface 164 and memory 166. The network interface 164 may be configured to use any suitable type of communication protocol.

Memory 166 may be volatile or non-volatile and may comprise a read-only memory (ROM), random-access memory (RAM), ternary content-addressable memory (TCAM), dynamic random-access memory (DRAM), and static random-access memory (SRAM). Memory 166 may be implemented using one or more disks, tape drives, solid-state drives, and/or the like. Memory 166 is operable to store the data and instructions as described with respect to FIGS. 1-4. The software instruction set 168 may comprise any suitable set of instructions, logic, rules, or code operable to execute the processor 162.

Database System

The database system 180 is a device that is configured to process data and communicate with computing devices, databases, systems, etc., via one or more networks. The database system 180 is generally configured to store data sets, clean data sets, and allow access to data sets. Although in some embodiments the database system can be configured to perform any of the functions described herein.

The processor 182 is in signal communication with the network interface 184 and the memory 186. Memory 186 is configured to store software instruction set 188 that when executed by the processor 182, causes the processor 182 to perform one or more functions described herein. For example, when the software instruction set 188 is executed, the processor 182 can store data sets and clean data sets. The database system 180 may be configured as shown, or in any other configuration.

Processor 182 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 182 may be a programmable logic device, a microcontroller, a microprocessor, or any suitable combination of the preceding. The processor 182 is communicatively coupled to and in signal communication with the network interface 184 and memory 186. The one or more processors are configured to process data and may be implemented in hardware or software. For example, the processor 182 may be 8-bit, 16-bit, 32-bit, 64-bit, or of any other suitable architecture. The processor 182 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 188 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 184 is configured to enable wired and/or wireless communications. The network interface 184 is configured to communicate data between the memory 186 and other network devices, systems, or domain(s). For example, the network interface 184 may comprise a WIFI interface, a local area network (LAN) interface, a wide area network (WAN) interface, a modem, a switch, or a router. The processor 182 is configured to send and receive data using the network interface 184 and memory 186. The network interface 184 may be configured to use any suitable type of communication protocol.

Memory 186 may be volatile or non-volatile and may comprise a read-only memory (ROM), random-access memory (RAM), ternary content-addressable memory (TCAM), dynamic random-access memory (DRAM), and static random-access memory (SRAM). Memory 186 may be implemented using one or more disks, tape drives, solid-state drives, and/or the like. Memory 186 is operable to store the data sets and cleaned data sets. The software instruction set 188 may comprise any suitable set of instructions, logic, rules, or code operable to execute the processor 182.

Routing System

Routing Controller

The routing controller 220 is a device that is configured to process data and communicate with computing devices, databases, systems, etc., via one or more networks. The routing controller 220 is generally configured to store scaling factors, encryption keys, decryption keys, obfuscate input data, decipher model output data, identify predictive results, and provide those results to a user device. This operation is described further below in conjunction with the sections entitled "Operational Flow" and "Example methods."

The processor 222 is in signal communication with the network interface 224 and the memory 226. Memory 226 is configured to store software instruction set 228 that when executed by the processor 222, causes the processor 222 to perform one or more functions described herein. The routing controller 220 may be configured as shown, or in any other configuration.

Processor 222 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 222 may be a programmable logic device, a microcontroller, a microprocessor, or any suitable combination of the preceding. The processor 222 is communicatively coupled to and in signal communication with the network interface 224 and memory 226. The one or more processors are configured to process data and may be implemented in hardware or software. For example, the processor 222 may be 8-bit, 16-bit, 32-bit, 64-bit, or of any other suitable architecture. The processor 222 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 228 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 224 is configured to enable wired and/or wireless communications. The network interface 224 is configured to communicate data between the memory 226 and other network devices, systems, or domain(s). For example, the network interface 224 may comprise a WIFI interface, a local area network (LAN) interface, a wide area network (WAN) interface, a modem, a switch, or a router. The processor 222 is configured to send and receive data using the network interface 224 and memory 226. The network interface 224 may be configured to use any suitable type of communication protocol.

Memory 226 may be volatile or non-volatile and may comprise a read-only memory (ROM), random-access memory (RAM), ternary content-addressable memory (TCAM), dynamic random-access memory (DRAM), and static random-access memory (SRAM). Memory 226 may be implemented using one or more disks, tape drives, solid-state drives, and/or the like. Memory 226 is operable to store the data and instructions as described with respect to FIGS. 1-4. The software instruction set 228 may comprise any suitable set of instructions, logic, rules, or code operable to execute the processor 222.

Analytics Controller

The analytics controller 240 is a device that is configured to process data and communicate with computing devices, databases, systems, etc., via one or more networks. The analytics controller 240 is generally configured to store analytics models and obfuscated model output. This operation is described further below in conjunction with the sections entitled "Operational Flow" and "Example methods."

The processor 242 is in signal communication with the network interface 244 and the memory 246. Memory 246 is configured to store software instruction set 248 that when executed by the processor 242, causes the processor 242 to perform one or more functions described herein. The routing controller 220 may be configured as shown, or in any other configuration.

Processor 242 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 242 may be a programmable logic device, a microcontroller, a microprocessor, or any suitable combination of the preceding. The processor 242 is communicatively coupled to and in signal communication with the network interface 244 and memory 246. The one or more processors are configured to process data and may be implemented in hardware or software. For example, the processor 242 may be 8-bit, 16-bit, 32-bit, 64-bit, or of any other suitable architecture. The processor 242 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 248 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 244 is configured to enable wired and/or wireless communications. The network interface 244 is configured to communicate data between the memory 246 and other network devices, systems, or domain(s). For example, the network interface 244 may comprise a WIFI interface, a local area network (LAN) interface, a wide area network (WAN) interface, a modem, a switch, or a router. The processor 242 is configured to send and receive data using the network interface 244 and memory 246. The network interface 244 may be configured to use any suitable type of communication protocol.

Memory 246 may be volatile or non-volatile and may comprise a read-only memory (ROM), random-access memory (RAM), ternary content-addressable memory (TCAM), dynamic random-access memory (DRAM), and static random-access memory (SRAM). Memory 246 may be implemented using one or more disks, tape drives, solid-state drives, and/or the like. Memory 246 is operable to store the data and instructions as described with respect to FIGS. 1-4. The software instruction set 248 may comprise any suitable set of instructions, logic, rules, or code operable to execute the processor 242.

Operational Flow

Practical Application

A business may use analytics models to evaluate customer data, i.e. the sensitive data, against selected outcomes to make predictions that may impact revenue or income, as an example. In these situations, the machine learning algorithm is developed using samples of the sensitive data to create a mathematical model having a coefficient and parameter space formed based on patterns found in the samples. With respect to supervised machine learning algorithms, a developer uses structured, i.e. tagged, samples of data to train a mathematical, such as regression analysis, algorithm. With respect to unsupervised machine learning algorithms, a developer uses unstructured samples of data to train a mathematical, such as clustering, algorithm. In these situations, the security controller 120 operates as a security proxy by obfuscating sensitive data before the data are used by the developer. Although the obfuscation prevents the data from being exposed in plain text to the developer, the developer is still able to develop the model.

In a practical application for developing a machine learning algorithm, the data set 190a is provided to the security controller 120 by the database system 180. The security controller 120 obfuscates the validation section 134 and the model development section 136. As an example, the text data 134a and 136a are encrypted using the public key of the public and private key pair 132 and the numeric data 134b and 136b are scaled using the scaling factor 130. As an example of using the scaling factor, numeric values associated with the numeric data 134b and 136b may be adjusted up or down by a set amount. The obfuscated sections 138, 140 are provided to the model development controller 160.

To build the model 172a, the model development controller 160 generates output data by applying the obfuscated model development section 138, encrypted text 138a and scaled numeric data 138b, to the one or more machine learning algorithms 170. The model development controller 160 evaluates the output data to identify the first output data 174 that have recognized and acceptable patterns, detected obfuscated first output patterns 174a. The model development controller 160 then applies the obfuscated validation section 140, encrypted text 140a and scaled numeric data 140b, to the model 172a to generate the second output data 176 that have recognized and acceptable patterns, detected obfuscated second output patterns 176a. A recognized pattern, for example, may be based on an understood grouping of data that has a score or scores within an acceptable range. To validate the model 172a, the model development controller 160 compares the obfuscated first output patterns 174a with the obfuscated second output patterns 174b to determine the differences and validate accordingly. For a valid model, the output patterns 174a, 174b should have a dependent pattern with respect to the model's independent and dependent variables.

The first output data 174 and the second output data 176 are provide to the security controller 120. The first and second output data 174 and 176 are deciphered to generate deciphered first output 142 and second output 144. For example, the first and second output data 174 and 176 can be decrypted using the private key of the public and private key pair 132.

In a practical application for using the verified model 172b, the evaluation input data 262 is provided to the routing controller 220. The routing controller 220 obfuscates the input data 262 using the public key of the public/private key pair 132. The obfuscated input data 230 is provided to the analytics controller 240. The analytics controller 240 generates obfuscated model output 250 by applying the obfuscated input data 230 to the verified model 172b. The obfuscated model output 250 is provided to the routing controller 220 and the routing controller 220 deciphers the obfuscated model output 250. The obfuscated model output 250 is provided to the user device 260 for further processing, display, or both.

Security Controller, Model Development Controller, and Database System

Referring to FIG. 1, the one or more processors 122, 162, 182 sections the data set 190b into a validation section 134 and a model development section 136. The validation section 134 includes text data 134a and numeric data 134b and the model development section 136 includes text data 136a and numeric data 136b. The one or more processors 122, 162, 182 obfuscate the model development section 136 by encrypting the text data 136a using a public key of a public and private key pair 132 and by scaling the numeric data 136b using the scaling factor 130. The one or more processors 122, 162, 182 obfuscate the validation section 134 by encrypting the text data 134a using the public key of the public and private key pair 132 and by scaling the numeric data 134b using the scaling factor 130. The one or more processors 122, 162 build a model 172a by executing a machine learning algorithm 170 using the obfuscated model development section 138 and deriving patterns 174a from the output data 174. The output data 174 includes text data 174b and numeric data 174c. The one or more processors 122, 162, 182 generate second output data by applying the obfuscated validation section 140 to the model 172a and deriving output patterns 176a from the output data 176. The output data includes text data 176b and numeric data 176c. The one or more processors 122, 162, 182 compares the obfuscated output patterns 174a with the obfuscated output patterns 176a. The one or more processors 122, 162, 182 validates the model 172a based on sufficient similarities in the obfuscated output patterns 174a, 176a.

In some embodiments, the one or more processors 122, 162, 182 decipher the output data 174 by decrypting the text data 174b using a private key of the public and private key pair 132 and by scaling the numeric data 174c using the scaling factor. The one or more processors 122, 162, 182 decipher the output data 176 by decrypting the text data 176b using the private key of the public and private key pair 132 and by scaling the numeric data 176c using the scaling factor 130. The one or more processors 122, 162, 182 compare the decrypted text data 174b, the decrypted numeric data 174c, the decrypted text data 176b and the decrypted numeric data 176c, or any combination thereof with the data set 190a, 190b, or both. The one or more processors 122, 162, 182 verifies the model 172a based on the integrity of the data. The integrity can include the authenticity and accuracy of the data. If there any differences and/or if the differences are significant enough, e.g. to fall outside of a tolerance range, in the comparison of the decrypted text data 174b, the decrypted numeric data 174c, the decrypted text data 176b and the decrypted numeric data 176c, or any combination thereof with the data set, the one or more processors 122, 162, 182 rejects or invalidates the model 172a.

In other embodiments, the data set 190b is a training data set and the one or more processors 122, 162, 182 generate the output data 174, 176 and derive the output patterns 174a, 176a using a supervised machine learning algorithm. In other embodiments, the data set 190b comprises untagged data and the one or more processors 122, 162, 182 are further configured to generate the output data 174, 176 and derive the output patterns 174a, 176a using an unsupervised machine learning algorithm.

In yet other embodiments, the one or more processors 122, 162, 182 clean the data set 192 by, for example, removing duplicate data, corrupt data, incorrect or inaccurate data.

Routing Controller, Analytics Controller, and User Device

The one or more processors 222, 224 obfuscate the evaluation input 262 by encrypting the evaluation text data 262a using the public key of the public/private key pair 132 and scaling the evaluation numeric data 262b using the scaling factor 130. The one or more processors 122, 162, 182 populate a parameter space of the verified model 172b using the obfuscated text data 230a and the obfuscated numeric data 230b of the obfuscated evaluation input data 230. The one or more processors 122, 162, 182 executes the model 172b to generate obfuscated model output 250.

The one or more processors 222, 224 decipher the obfuscated text data 230a by decrypting the encrypted text data 230a using the private key of the public/private key pair 132 and descaling the scaled numeric data 230b using the scaling factor 130. The one or more processors 222, 224 display or cause to be displayed the deciphered evaluation text data 232a and deciphered evaluation numeric data 232b of the deciphered model output 232 on the user device 260.

Example Methods
Example Method of Developing a Model Using Asymmetric Encryption to Secure Data Pipelines FIG. 3 illustrates an example flowchart of a method 300 for securing sensitive data and developing a model, according to certain embodiments. The security controller 120, the model development controller 160, and the database system 180 are activated upon receipt of an activation signal.

At block 302, the data set 190, scaling factor 130, the public/private key pair 132, and the machine learning algorithm 170 are stored for use by the security controller 120 and model development controller 160.

At block 304 and 306, the data set 190 is sectioned into a model development section 136, e.g. 70% of the data set 190, and a validation section 134 and obfuscated. The model development section 136 comprises text data 136a and numeric data 136b and the validation section 134 comprises text data 134a and numeric data 134b. The model development section 136 and the validation section 134 are obfuscated, for example, by encrypting the text data 136a, 134a using a public key of the key pair 132 and scaling the numeric data 136b, 134b using the scaling factor 130.

At block 308, the model development controller 160 generates output data 174 and derives output patterns from the output data 174 by applying the encrypted text data 138a and the scaled numeric data 138b of the obfuscated model development section 138 to the machine learning algorithm 170. At block 310, the model development controller 160 builds the model 172 by identifying recognizable and acceptable patterns 174a in the output data 174 and selecting the parameter space associated with generating the patterns 174a. At block 312, the model development controller 160 generates output data 176 and derives output patterns 176a from the output data 176 by applying the encrypted text data 140a and the scaled numeric data 140b of the obfuscated validation section 140 to the model 172. At block 314, the model development controller 160 compares the output patterns 174a, 176a and validates the model 172 based on the consistencies in the dependencies of their patterns 174a, 176a. At block 316, the security controller 120 determines if the model 172 is valid. If the model 172 is validated, the security controller 120 moves to block 318, otherwise the security controller 120 ends execution or returns to one of the previous blocks and reinitiates execution there.

At block 318 and 320, the security controller 120 deciphers the text data 174b and the numeric data 174c of the output data 174 and the text data 176b and the numeric data 176c of the output data 176 using the private key of the public and private key pair 132 and the scaling factor 130. In some embodiments only the text data 174b, 176b or the numeric data 174c, 176c or any combinations thereof may be deciphered to validate the model 172. At block 322, the security controller 120 or the database system 180 compares the deciphered text data 142a, 144a and the deciphered numeric data 142b, 144b with the dataset 190a, 190b, or both. At block 324, the security controller 120 or the database system 180 determines if there is a match. If there is a match, the security controller 120 or the database system 180 makes the verified model 172b available for use, otherwise the security controller 120 or database system 180 ends execution or returns to one of the previous blocks and reinitiates execution there.

Example Method of Using the Model Developed Using Asymmetric Encryption to Secure Data Pipelines FIG. 4 illustrates an example flowchart of a method 400 for using the model developed as described in the method 300 of FIG. 3, according to certain embodiments. The routing controller 220 and the analytics controller 240 are activated upon receipt of an activation signal.

At block 402, the data input 262 is cleaned by removing or replacing corrupt, duplicated, or missing data. At block 404, the data input 262 and the verified model 172b are stored in memory 226, 246. At block 406, the data input 262 is obfuscated, e.g. by encrypting the text data 262a using the public key of the public/private key pair 132 and scaling the numeric data 262b using the scaling factor 130. At block 408, the parameter space of the verified model 172b is populated using the obfuscated input data 230 and the obfuscated model output 250 is generated by executing the verified model 172b. The obfuscated model output 250. The routing controller 220 deciphers the obfuscated model output 250 by decrypting the encrypted text data 230a using the private key of the public/private key pair 132 and descaling the scaled numeric data 230b using the scaling factor 130. At block 412, the deciphered model output 232 is evaluated to identify predictive results associated with the decrypted text data 232a and the decrypted numeric data 232b. At block 414, the predictive results are displayed or caused to be displayed on the user device 260. Execution of the routing controller 220 and the analytics controller 240 is terminated or execution returns to one of the previous blocks and reinitiates execution there.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
one or more memories configured to store executable instructions, a data set provided by an external database system, at least one public and private key pair, at least one machine learning algorithm, and at least one scaling factor, the data set comprising a model development section that includes first text data and first numeric data and a validation section that includes second text data and second numeric data; and
one or more hardware processors communicatively coupled to the one or more memories, wherein the executable instructions are executed by the one or more hardware processors to cause the one or more hardware processors to:
obfuscate the model development section by encrypting the first text data using a public key of a public and private key pair and by scaling the first numeric data using a scaling factor;
obfuscate the validation section by encrypting the second text data using the public key of the public and private key pair and by scaling the second numeric data using the scaling factor;

build a model by generating first output data from the obfuscated model development section and deriving first output patterns from the first output data by executing a machine learning algorithm, wherein the first output data includes third text data and third numeric data;

generate second output data by applying the obfuscated validation section to the model and deriving second output patterns from the second output data, wherein the second output data includes fourth text data and fourth numeric data;

compare the obfuscated first output patterns with the obfuscated second output patterns;

validate the model based on similarities in the obfuscated first output patterns and the second output patterns;

decipher the first output data by decrypting the third text data using a private key of the public and private key pair and by scaling the third numeric data using the scaling factor;

decipher the second output data by decrypting the fourth text data using the private key of the public and private key pair and by scaling the fourth numeric data using the scaling factor;

compare the decrypted third text data, the decrypted third numeric data, the decrypted fourth text data and the decrypted fourth numeric data;

determine a match between the third text data and the fourth text data and the third numeric data and the fourth numeric data; and verify the model based on the determined match.

2. The system of claim 1, wherein the data set is a training data set and the one or more hardware processors are further configured to:

generate the first output data and derive the first output patterns using a supervised machine learning algorithm; and generate the second output data and derive the second output patterns by using the supervised machine learning algorithm.

3. The system of claim 1, wherein the data set comprises untagged data and the one or more hardware processors are further configured to:

generate the first output data and derive the first output patterns using an unsupervised machine learning algorithm; and generate the second output data and derive the second output patterns using the unsupervised machine learning algorithm.

4. The system of claim 1, wherein the one or more hardware processors are further configured to verify the model by comparing the deciphered first output data and the deciphered second output data with the data set, the data set comprising cleansed text data, cleansed numeric, uncleansed text data, uncleansed numeric data, or any combination thereof.

5. The system of claim 1, wherein:

the one or more memories are configured to store evaluation input data comprising evaluation text data and evaluation numeric data; and the one or more hardware processors are further configured to:

obfuscate the evaluation input data by encrypting the evaluation text data using the public key and scaling the evaluation numeric data using a scaling factor;

populate a parameter space of the verified model using the obfuscated evaluation text data and the obfuscated evaluation numeric data; and execute the model to generate obfuscated model output data.

6. The system of claim 5, wherein the one or more hardware processors are further configured to:

decipher the encrypted evaluation text data by decrypting the encrypted evaluation text data using the private key and descaling the scaled evaluation numeric data using the scaling factor;

identify predictive results in the decrypted evaluation text data and the descaled numeric data; and cause the predictive results to be displayed on a user device.

7. The system of claim 5, wherein the one or more hardware processors are further configured to clean the data set.

8. A method, comprising:

storing a data set obtained from a database system, at least one public and private key pair, at least one machine learning algorithm, and at least one scaling factor, the data set comprising a model development section that includes first text data and first numeric data and a validation section that includes second text data and second numeric data;

obfuscating the model development section by encrypting the first text data using a public key of a public and private key pair and by scaling the first numeric data using a scaling factor;

obfuscating the validation section by encrypting the second text data using the public key of the public and private key pair and by scaling the second numeric data using the scaling factor;

building a model by generating first output data from the obfuscated model development section and deriving first output patterns from the first output data by executing a machine learning algorithm, wherein the first output data includes third text data and third numeric data;

generating second output data by operating the model using the obfuscated validation section and deriving second output patterns from the second output data, wherein the second output data includes fourth text data and fourth numeric data;

comparing the obfuscated first output patterns with the obfuscated second output patterns;

validating the model based on similarities in the obfuscated first output patterns and the second output patterns;

deciphering the first output data by decrypting the third text data using a private key of the public and private key pair and by scaling the third numeric data using the scaling factor;

deciphering the second output data by decrypting the fourth text data using the private key of the public and private key pair and by scaling the fourth numeric data using the scaling factor;

comparing the decrypted third text data, the decrypted third numeric data, the decrypted fourth text data and the decrypted fourth numeric data;

determining a match between the third text data and the fourth text data and the third numeric data and the fourth numeric data; and verifying the model based on the determined match.

9. The method of claim 8, wherein the data set is a training data set and the method further comprises:
generating the first output data and derive the first output patterns using a supervised machine learning algorithm; and
generating the second output data and derive the second output patterns by using the supervised machine learning algorithm.

10. The method of claim 8, wherein the data set comprises untagged data and the method further comprises:
generating the first output data and derive the first output patterns using an unsupervised machine learning algorithm; and
generating the second output data and derive the second output patterns using the unsupervised machine learning algorithm.

11. The method of claim 8, further comprising verifying the model by comparing the deciphered first output data and the deciphered second output data with the data set, the data set comprising cleansed text data, cleansed numeric, uncleansed text data, uncleansed numeric data, or any combination thereof.

12. The method of claim 8, further comprising:
storing evaluation input data comprising evaluation text data and evaluation numeric data;
obfuscating the evaluation input data by encrypting the evaluation text data using the public key and scaling the evaluation numeric data using a scaling factor;
populating a parameter space of the verified model using the obfuscated evaluation text data and the obfuscated evaluation numeric data; and
executing the model to generate obfuscated model output data.

13. The method of claim 12, further comprising:
deciphering the encrypted evaluation text data by decrypting the encrypted evaluation text data using the private key and descaling the scaled evaluation numeric data using the scaling factor;
identifying predictive results in the decrypted evaluation text data and the descaled numeric data; and
causing the predictive results to be displayed on a user device.

14. The method of claim 12, further comprising cleaning the data set.

15. A non-transitory computer-readable storage medium, the computer-readable storage medium including instructions that when executed by a processor, cause the processor to:
store a data set that is obtained from a database system, at least one public and private key pair, at least one machine learning algorithm, and at least one scaling factor, the data set comprising a model development section that includes first text data and first numeric data and a validation section that includes second text data and second numeric data;
obfuscate the model development section by encrypting the first text data using a public key of a public and private key pair and by scaling the first numeric data using a scaling factor;
obfuscate the validation section by encrypting the second text data using the public key of the public and private key pair and by scaling the second numeric data using the scaling factor;
build a model by generating first output data from the obfuscated model development section and deriving first output patterns from the first output data by executing a machine learning algorithm, wherein the first output data includes third text data and third numeric data;
generate second output data by applying the obfuscated validation section to the model and deriving second output patterns from the second output data, wherein the second output data includes fourth text data and fourth numeric data;
compare the obfuscated first output patterns with the obfuscated second output patterns;
validate the model based on similarities in the obfuscated first output patterns and the second output patterns;
decipher the first output data by decrypting the third text data using a private key of the public and private key pair and by scaling the third numeric data using the scaling factor;
decipher the second output data by decrypting the fourth text data using the private key of the public and private key pair and by scaling the fourth numeric data using the scaling factor;
compare the decrypted third text data, the decrypted third numeric data, the decrypted fourth text data and the decrypted fourth numeric data;
determine a match between the third text data and the fourth text data and the third numeric data and the fourth numeric data; and
verify the model based on the determined match.

16. The non-transitory computer-readable storage medium of claim 15, wherein the data set is a training data set and the instructions further cause the processor to:
generate the first output data and derive the first output patterns using a supervised machine learning algorithm; and
generate the second output data and derive the second output patterns by using the supervised machine learning algorithm.

17. The non-transitory computer-readable storage medium of claim 15, wherein the data set comprises untagged data and the instructions further cause the processor to:
generate the first output data and derive the first output patterns using an unsupervised machine learning algorithm; and
generate the second output data and derive the second output patterns using the unsupervised machine learning algorithm.

18. The non-transitory computer-readable storage medium of claim 15, wherein the instructions further cause the processor to clean the data set.

19. The non-transitory computer-readable storage medium of claim 15, wherein the instructions further cause the processor to:
store evaluation input data comprising evaluation text data and evaluation numeric data;
obfuscate the evaluation input data by encrypting the evaluation text data using the public key and scaling the evaluation numeric data using a scaling factor;
populate a parameter space of the verified model using the obfuscated evaluation text data and the obfuscated evaluation numeric data; and
execute the model to generate obfuscated model output data.

20. The non-transitory computer-readable storage medium of claim 19, wherein the instructions further cause the processor to:
- decipher the encrypted evaluation text data by decrypting the encrypted evaluation text data using the private key and descaling the scaled evaluation numeric data using the scaling factor;
- identify predictive results in the decrypted evaluation text data and the descaled numeric data; and
- cause the predictive results to be displayed on a user device.

\* \* \* \* \*